F. CONRAD & W. M. BRADSHAW.
METERING SYSTEM.
APPLICATION FILED JUNE 4, 1906.
1,029,743.
Patented June 18, 1912.
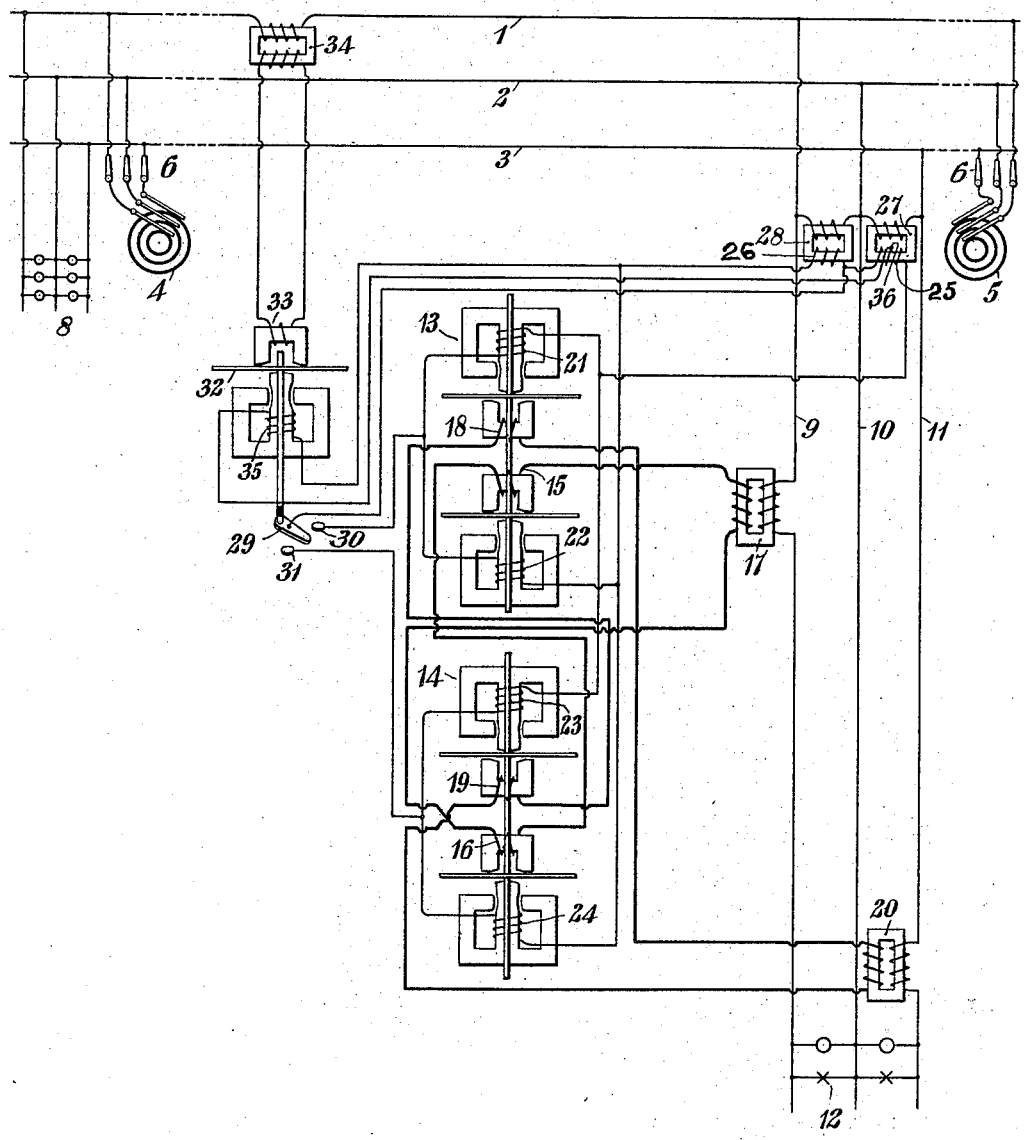
WITNESSES:
INVENTORS
Frank Conrad
William M. Bradshaw
BY
ATTORNEY

UNITED STATES PATENT OFFICE.

FRANK CONRAD, OF SWISSVALE, AND WILLIAM M. BRADSHAW, OF WILKINSBURG, PENNSYLVANIA, ASSIGNORS TO WESTINGHOUSE ELECTRIC & MANUFACTURING COMPANY, A CORPORATION OF PENNSYLVANIA.

METERING SYSTEM.

1,029,743.          Specification of Letters Patent.          Patented June 18, 1912.

Application filed June 4, 1906. Serial No. 320,129.

*To all whom it may concern:*

Be it known that we, FRANK CONRAD and WILLIAM M. BRADSHAW, citizens of the United States, and residents, respectively, of Swissvale and of Wilkinsburg, in the county of Allegheny and State of Pennsylvania, have invented a new and useful Improvement in Metering Systems, of which the following is a specification.

Our invention relates to means for measuring the energy in electrical circuits, and it has for its object to provide means whereby the energy supplied to a circuit from each of several sources may be measured, and whereby the instruments employed for the purpose may be selected automatically.

Cities and other districts in which large amounts of power are used are frequently supplied from two power stations, one in the vicinity of where the power is used and the other at a convenient place some distance away, small towns or other consumers that are located between the power stations, frequently being supplied also from the distributing system. When the demand for power is insufficient to warrant operation of both stations, one of them may be disconnected from the distributing circuit, and in such cases, it may be advisable to know how much power is supplied to the various branch and main circuits from each power station. According to the present invention, two instruments are provided at each feeder or supply circuit, one corresponding to each power station, and means are further provided whereby the instruments are selected to measure the power according to the station from which the circuits are supplied.

The single figure of the accompanying drawing is a diagrammatic view of a system that is arranged in accordance with our invention.

A distributing circuit that comprises conductors 1, 2 and 3 is supplied with three-phase alternating current from two suitable sources 4 and 5, either of which may be disconnected from the distributing circuit by means of its set of switches 6 when, for any reason, it becomes desirable to supply power to the system from only one of the sources. The station 4 may be supposed to be located in or near a city where considerable amounts of power are supplied to devices such as those indicated at 8, some or all of which must be supplied from the station at 5 when the station at 4 is disconnected from the distributing system.

Located at one or more places between the power stations, and connected to the distributing conductors 1, 2 and 3 may be branch circuits, such as are indicated by conductors 9, 10 and 11, that supply translating devices 12. The power supplied to the branch circuit by each of the stations 4 and 5 is adapted to be measured by instruments 13 and 14, respectively, each of which may comprise two instruments substantially like that which forms the subject-matter of an application, Serial No. 243,739, filed Feb. 1, 1905, by one of us, i. e., William M. Bradshaw, or instruments of any other suitable type, the movable members of which are connected together. Series magnet windings 15 and 16, respectively, of the instruments 13 and 14 are supplied from a series transformer 17, the primary winding of which is connected in circuit with conductor 9, and series magnet windings 18 and 19 are supplied from a series transformer 20, the primary winding of which is connected in series with conductor 11 of the branch circuit. Shunt magnet windings 21 and 22 of the instrument 13 and shunt windings 23 and 24 of the instrument 14 are adapted to be supplied, respectively, from secondary windings 25 and 26 of transformers 27 and 28 the primary windings of which are connected between different pairs of the conductors of the branch circuit. The circuits of the shunt windings are controlled by means of a switch arm 29 that is adapted to be moved into engagement with the one or the other of stationary contact terminals 30 and 31 by means of a selective relay device 32, that may be also substantially the same in structure as the instrument which forms the subject-matter of the above-mentioned application, Serial No. 243,739, or of any other suitable type. Series magnet winding 33 of the device 32 is supplied from a transformer 34 the primary winding of which is connected in circuit with distributing conductor 1, and an electromotive force is impressed upon shunt magnet winding 35 of the instrument that is substantially in phase with that impressed upon series winding 33 by connecting it between one terminal of secondary winding 26 of the transformer 28 and approximately the middle point 36 of the secondary winding 25 of transformer 27.

When power is supplied to the devices at 12 from the station 4, current will traverse the windings of the series transformer 34 and the series winding 33 of the device 32 in such a direction that the arm 29 will be moved into engagement with contact terminal 30 and the instrument 13 will be employed to measure the power. If, however, power is supplied to the devices at 8 and 12 by the station 5, current will traverse the windings of the transformer 33 of the selective device 32 in such a direction that the switch arm 29 will be moved into engagement with the contact terminal 31 and the instrument 14 will be employed to measure the power supplied to the devices at 12.

While the invention has been shown as applied to a three-phase circuit, it will be readily understood that it may be also applied to circuits of other numbers of phases, and also that the arrangement of the circuits and the structural details of the devices may be considerably varied from what has been shown and described without altering the mode of operation of the invention or departing materially from its spirit, and we desire that such modifications be included within its scope.

We claim as our invention:

1. The combination with a plurality of sources of electrical energy, a transmission circuit extending between them, and a distributing circuit connected to the transmission circuit, of a measuring instrument corresponding to each of the sources and adapted to be operatively connected to the distributing circuit, and means for automatically selecting that instrument for measuring the energy of the circuit which corresponds to the active source.

2. The combination with two sources of electrical energy, and a distributing circuit therefor, of two measuring instruments adapted to be connected to the said circuit and having windings, and means for so controlling the circuits of said windings that the one or the other of the instruments shall be selected to measure the energy of said circuit in accordance with the source from which it is received.

3. The combination with two sources of polyphase electrical energy, and a distributing circuit therefor, of two polyphase electrical measuring instruments, and a single-phase selective device for connecting the one or the other of the instruments in circuit to measure the energy thereof in accordance with the source from which it is received.

4. The combination with a plurality of sources of electrical energy, a main circuit, means adapted to connect one or more of the sources thereto, and a branch circuit connected to the main circuit between the sources, of a measuring instrument corresponding to each source and associated with the branch circuit, and means whereby that instrument may be automatically selected to measure the energy supplied to the branch circuit which corresponds to the source from which it is supplied.

5. The combination with a plurality of sources of electrical energy, and a circuit supplied therefrom, of a measuring instrument corresponding to each source, a single set of auxiliary devices interposed between the circuit and the instruments, and means whereby that instrument may be automatically selected to measure the energy supplied to the branch circuit which corresponds to the source from which it is supplied.

In testimony whereof, we have hereunto subscribed our names this 29th day of May, 1906.

FRANK CONRAD.
WILLIAM M. BRADSHAW.

Witnesses:
  FRED. R. KUNKEL,
  BIRNEY HINES.

---

Copies of this patent may be obtained for five cents each, by addressing the "Commissioner of Patents, Washington, D. C."